United States Patent
Chen et al.

(10) Patent No.: US 11,120,032 B1
(45) Date of Patent: Sep. 14, 2021

(54) REDUCING CONSUMPTION OF COMPUTING RESOURCES IN PERFORMING COMPUTERIZED SEQUENCE-MINING ON LARGE DATA SETS

(71) Applicant: SAS Institute Inc., Cary, NC (US)

(72) Inventors: Xilong Chen, Chapel Hill, NC (US); Xunlei Wu, Cary, NC (US); Jan Chvosta, Raleigh, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 17/209,752

(22) Filed: Mar. 23, 2021

Related U.S. Application Data

(60) Provisional application No. 63/056,981, filed on Jul. 27, 2020, provisional application No. 63/055,769, filed on Jul. 23, 2020, provisional application No. 63/053,665, filed on Jul. 19, 2020.

(51) Int. Cl.
*G06F 16/2458* (2019.01)
*G06F 16/2453* (2019.01)

(52) U.S. Cl.
CPC ...... *G06F 16/2465* (2019.01); *G06F 16/2474* (2019.01); *G06F 16/24549* (2019.01); *G06F 2216/03* (2013.01)

(58) Field of Classification Search
CPC .................. G06F 16/2465; G06F 2216/03
See application file for complete search history.

(56) References Cited

U.S. PATENT DOCUMENTS

| 9,208,131 | B2 | 12/2015 | Chen et al. |
| 9,798,575 | B2 | 10/2017 | Chen et al. |
| 10,642,642 | B2 | 5/2020 | Chen et al. |

(Continued)

OTHER PUBLICATIONS

SAS Help Center: Sequence Details, https://go.documentation.sas.com/?docsetId=casanpg&docsetVersion=8.3&docsetTarget=n0zygff59pcxecn1ip2o2zebdu1d.htm&locale=en, 2 pages (2019).

(Continued)

*Primary Examiner* — William Spieler
(74) *Attorney, Agent, or Firm* — Kilpatrick Townsend & Stockton LLP

(57) ABSTRACT

Computing resources consumed in performing computerized sequence-mining can be reduced by implementing some examples of the present disclosure. In one example, a system can determine weights for data entries in a data set and then select a group of data entries from the data set based on the weights. Next, the system can determine a group of k-length sequences present in the selected group of data entries by applying a shuffling algorithm. The system can then determine frequencies corresponding to the group of k-length sequences and select candidate sequences from among the group of k-length sequences based on the frequencies thereof. Next, the system can determine support values corresponding to the candidate sequences and then select output sequences from among the candidate sequences based on the support values thereof. The system may then transmit an output signal indicating the selected output sequences an electronic device.

30 Claims, 18 Drawing Sheets

(56) References Cited

U.S. PATENT DOCUMENTS

2017/0161337 A1* 6/2017 Yao .................. G06F 16/24578

OTHER PUBLICATIONS

SAS Help Center: Association Rule Mining Action Set, https://go.documentation.sas.com/?docsetId=casactml&docsetTarget=casactml_rulemining_examples01.htm&docsetVersion=8.2&locale=en, 3 pages (2017).
Buchta et al., "Mining Frequent Sequences", Package 'arulesSequences', pp. 1-41 (2020).
Chapter 8 Mining Stream, Time-Series, and Sequence Data; Mining Sequence Patterns in Transactional Databases, pp. 32-68, http://hani.cs.illinois.edu/cs412/bk3/7_sequential_pattern_mining.pdf.

* cited by examiner

| SID | EID | Items |
|---|---|---|
| 1 | 2000 | E F |
| 1 | 2001 | F G H |
| 1 | 2002 | C G H |
| 1 | 2003 | C E F H |
| 2 | 2000 | C G H |
| 2 | 2001 | D |
| 3 | 2000 | C G H |
| 4 | 2000 | A B E |
| 4 | 2001 | C G |
| 4 | 2002 | A B H |

1302

| Frequent Sequences | |
|---|---|
| Frequent 1-Sequences | |
| C | 4 |
| E | 2 |
| G | 4 |
| H | 4 |
| Frequent 2-Sequences | |
| GH | 3 |
| CH | 3 |
| G->H | 2 |
| CG | 4 |
| E->H | 2 |
| E->G | 2 |
| E->C | 2 |
| C->H | 2 |
| Frequent 3-Sequences | |
| CGH | 3 |
| CG->A | 2 |
| E->CG | 2 |
| E->G->H | 2 |
| E->C->H | 2 |
| Frequent 4-Sequences | |
| E->CG->H | 2 |

| N | Support>5% $M_0 = 303,300$ | | Support>10% $M_0 = 62,191$ | | Support>20% $M_0 = 9,249$ | | Support>40% $M_0 = 1,155$ | |
|---|---|---|---|---|---|---|---|---|
| | M | $M/M_0$ | M | $M/M_0$ | M | $M/M_0$ | M | $M/M_0$ |
| 1,000,000 | 28,316 | 0.093360 | 12,187 | 0.195961 | 3,503 | 0.378744 | 979 | 0.847619 |
| 4,000,000 | 79,036 | 0.260587 | 28,769 | 0.462591 | 6,597 | 0.713266 | 1,120 | 0.969697 |
| 16,000,000 | 164,966 | 0.543904 | 46,683 | 0.750639 | 8,746 | 0.945616 | 1,154 | 0.999134 |
| 64,000,000 | 250,756 | 0.826759 | 58,094 | 0.934122 | 9,203 | 0.995026 | 1,155 | 1.000000 |

FIG. 17

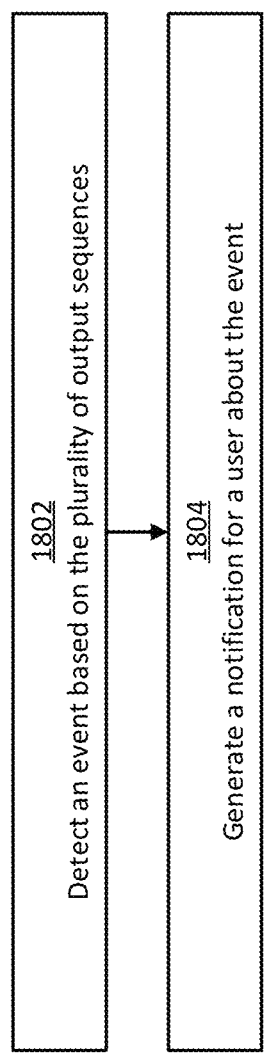

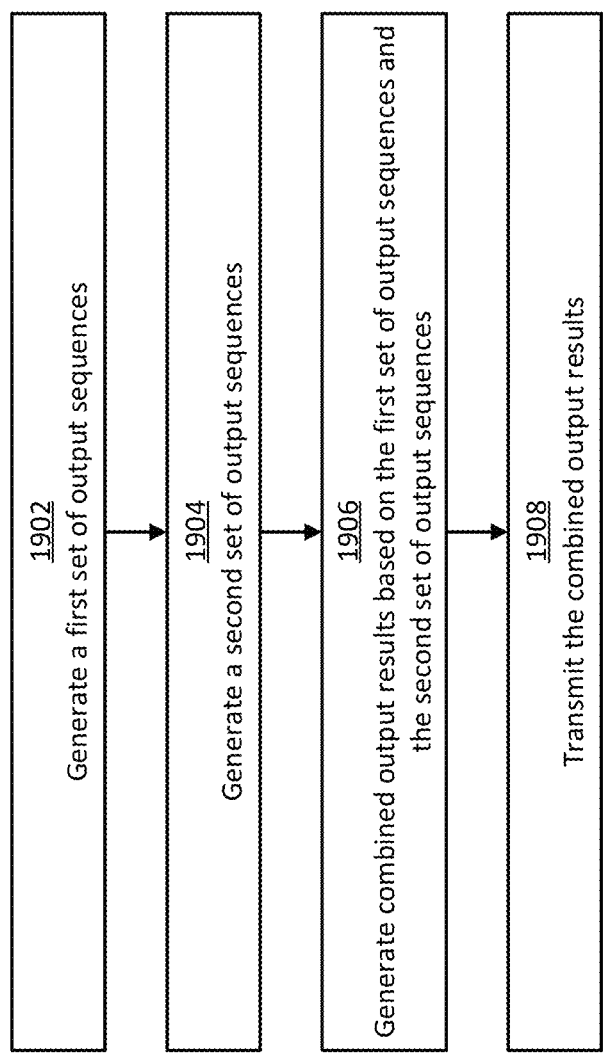

REDUCING CONSUMPTION OF COMPUTING RESOURCES IN PERFORMING COMPUTERIZED SEQUENCE-MINING ON LARGE DATA SETS

REFERENCE TO RELATED APPLICATION

This claims the benefit of priority under 35 U.S.C. § 119(e) to U.S. Provisional Patent Application No. 63/053,665, filed Jul. 19, 2020, to U.S. Provisional Patent Application No. 63/055,769, filed Jul. 23, 2020, and to U.S. Provisional Patent Application No. 63/056,981, filed Jul. 27, 2020, the entirety of each of which is hereby incorporated by reference herein.

TECHNICAL FIELD

The present disclosure relates generally to computerized sequence-mining. More specifically, but not by way of limitation, this disclosure provides techniques for reducing consumption of computing resources (e.g., CPU, GPU, and memory) when performing computerized sequence-mining on large data sets.

BACKGROUND

Sequence mining can refer to the mining of frequently occurring ordered events as patterns in a data set. In general, a sequence is a list of events that can be ordered by time or other factors. For example, a sequence s can be denoted as $\{e_1, e_2, e_2, \ldots, e_n\}$, where event $e_1$ occurred before event $e_2$, event $e_2$ occurred before event $e_3$, etc. Each event $e_j$, can also be referred to as an element of the sequence s. One specific example of such an event can be a network connection in which a user downloaded multiple pieces of software from a website. In this example, the event is a type of item set that includes a list of pieces of software that the user downloaded from the website. Such events (or item sets) can be denoted as $(x_1, x_2, \ldots, x_q)$, where $x_k$ is an item in the item set. If the user accessed the website multiple times and downloaded multiple pieces of software each time, those ordered events could form a sequence for the user. The number of items in a sequence can be referred to as the "length" of the sequence, with a sequence of length l being referred to as an i-sequence or an l-length sequence.

SUMMARY

One example of the present disclosure can include a system that comprises one or more processing devices and one or more memory devices. The one or more memory devices can include instructions that are executable by the one or more processing devices for causing the one or more processing devices to perform operations. The operations can include receiving a data set including a plurality of data entries. The operations can include determining a plurality of weights for the plurality of data entries, wherein each weight in the plurality of weights is determined for a respective data entry in the plurality of data entries. The operations can include selecting a group of data entries from among the plurality of data entries by executing a resampling algorithm with respect to the plurality of data entries based on the plurality of weights assigned to the plurality of data entries. The operations can include determining a plurality of k-length sequences present in the group of data entries, wherein each k-length sequence in the plurality of k-length sequences is determined by applying a shuffling algorithm to a respective data entry in the group of data entries. The operations can include determining a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences. The operations can include selecting a plurality of candidate sequences from among the plurality of k-length sequences by comparing the plurality of frequencies corresponding to the plurality of k-length sequences to a first predefined threshold. The operations can include determining a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries. The operations can include selecting a plurality of output sequences from among the plurality of candidate sequences by comparing the plurality of support values corresponding to the plurality of candidate sequences to a second predefined threshold. The operations can include transmitting an output signal indicating the plurality of output sequences to one or more electronic devices.

Another example of the present disclosure can include a non-transitory computer-readable medium comprising program code that is executable by one or more processing devices for causing the one or more processing devices to perform operations. The operations can include receiving a data set including a plurality of data entries. The operations can include determining a plurality of weights for the plurality of data entries, wherein each weight in the plurality of weights is determined for a respective data entry in the plurality of data entries. The operations can include selecting a group of data entries from among the plurality of data entries by executing a resampling algorithm with respect to the plurality of data entries based on the plurality of weights assigned to the plurality of data entries. The operations can include determining a plurality of k-length sequences present in the group of data entries, wherein each k-length sequence in the plurality of k-length sequences is determined by applying a shuffling algorithm to a respective data entry in the group of data entries. The operations can include determining a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences. The operations can include selecting a plurality of candidate sequences from among the plurality of k-length sequences by comparing the plurality of frequencies corresponding to the plurality of k-length sequences to a first predefined threshold. The operations can include determining a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries. The operations can include selecting a plurality of output sequences from among the plurality of candidate sequences by comparing the plurality of support values corresponding to the plurality of candidate sequences to a second predefined threshold. The operations can include transmitting an output signal indicating the plurality of output sequences to one or more electronic devices.

Yet another example of the present disclosure can include a method comprising operations. The operations can include receiving a data set including a plurality of data entries. The operations can include determining a plurality of weights for the plurality of data entries, wherein each weight in the plurality of weights is determined for a respective data entry in the plurality of data entries. The operations can include selecting a group of data entries from among the plurality of data entries by executing a resampling algorithm with respect to the plurality of data entries based on the plurality of weights assigned to the plurality of data entries. The operations can include determining a plurality of k-length sequences present in the group of data entries, wherein each k-length sequence in the plurality of k-length sequences is determined by applying a shuffling algorithm to a respective data entry in the group of data entries. The operations can include determining a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences. The operations can include selecting a plurality of candidate sequences from among the plurality of k-length sequences by comparing the plurality of frequencies corresponding to the plurality of k-length sequences to a first predefined threshold. The operations can include determining a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries. The operations can include selecting a plurality of output sequences from among the plurality of candidate sequences by comparing the plurality of support values corresponding to the plurality of candidate sequences to a second predefined threshold. The operations can include transmitting an output signal indicating the plurality of output sequences to one or more electronic devices. Some or all of the operations can be implemented be one or more processing devices.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 14 depicts an example of a data set and frequent sequences therein according to some aspects of the present disclosure.

FIG. 17 depicts a data table comparing the number of frequent sequences identified using two different sequence-mining techniques according to some aspects of the present disclosure.

FIG. 18 depicts an example of computing operations executed based on one or more identified output sequences according to some aspects of the present disclosure.

FIG. 19 depicts an example of executing a sequence-mining process multiple times according to some aspects of the present disclosure.

Figure 1:
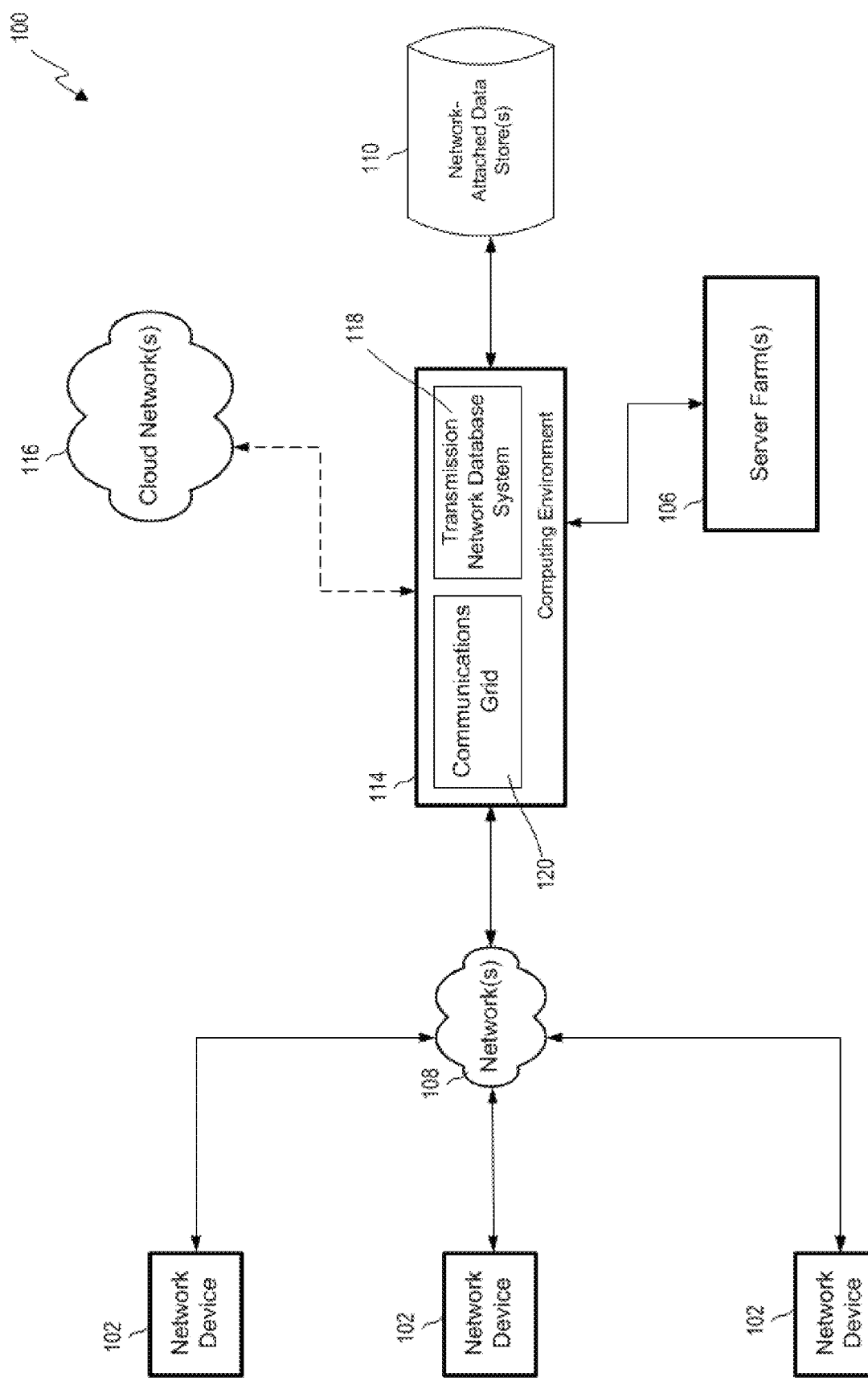
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

Computers can execute sequence mining software on datasets that include transactions of the same size or various sizes. A transaction can be a sequence corresponding to a particular entity (e.g., a user, unit, or section). A goal of the sequence mining process may be to identify some or all of the sequences of length k ("k-sequences") in a data set that have at least a minimum level of support in the dataset. The support level for a given k-length sequence in a data set can be the ratio of the number of transactions in the data set that have the k-length sequence over the total number of transactions in the data set. Such k-length sequences that have at least the minimum level of support can be referred to as "frequent sequences" in the data set.

While it can be desirable in many industries to identify frequent sequences in data sets, it can also be highly computationally intensive to do so using conventional sequence-mining software. For example, a large data set can include 20 million rows of data spread across 20 thousand transactions relating to two thousand items, where each transaction has one thousand items. To identify frequent 10-sequences (i.e., sequences of length 10) in this data set, a computer executing conventional sequence-mining software may analyze upwards of $10^7$ sequences. The value $10^7$ is the approximation of $20000*C(1000,10)$, where $C(1000,10)$ denotes the number of 10-combinations from a given set of one thousand items and can be calculated using the equation $n!/(10!(n-10)!)$, where n is the number of items (e.g., one thousand). Analyzing that many sequences can be exceedingly slow and consume a large amount of computing resources such as processing power, electrical power, and memory. Larger data sets may drain even more computing resources, because the search space exponentially increases as the size of the data set and the length k of the sequence increases. In addition to consuming large amounts of computing resources, conventional sequence-mining software is often not designed to handle such a large search space and may simply fail (e.g., timeout or produce other errors without returning a result) if given a large data set.

Some examples of the present disclosure can overcome one or more of the abovementioned problems by providing enhanced sequence-mining software that is designed to handle larger search spaces associated with larger data sets while consuming fewer consuming resources than conventional sequence-mining software. In particular, the enhanced sequence-mining software can execute a two-step process for performing sequence mining in relation to a data set. The first step can involve identifying candidate sequences in the data set using an improved technique that is designed to consume fewer computing resources than conventional sequence-mining software. A candidate sequence can be a k-length sequence that may or may not be a frequent sequence, depending on its level of support in the dataset. The second step can involve verifying whether the sampled candidate sequences have at least the minimum level of support in the data set to be considered a frequent sequence. The second step can be implemented using another improved technique that is designed to consume fewer computing resources than conventional sequence-mining software. The net effect of these improved techniques can be a significant reduction in computational complexity that translates into reduced execution time, an increased number of identified frequent sequences, and improved computer performance as compared to conventional sequence-mining software. The improved techniques can also be executed as an embarrassingly parallel workload spread across multiple processing devices (e.g., central processing units or graphical processing units) in a distributed computing environment, which can further improve performance as compared to conventional sequence-mining software.

More specifically, the enhanced sequence-mining software can execute the first step of the sequence mining process to identify certain candidate sequences in the data set that have a user-specified length (k). To do so, the sequence-mining software can begin by assigning weights to each data entry (e.g., transaction or observation) in the data set. In some examples, the weight for a data entry may be determined based on the number of possible k-sequences appearing in the data entry. For example, a data entry that contains a k-sequence may have a weight that is proportional to $C(n,k)=n!/(k!(n-k)!)$. The sequence-mining software can then select N data entries from the data set by executing a resampling algorithm using the weights assigned to the data entries. An example of the resampling algorithm could the stratified resampling algorithm that is described in the paper "Comparison of resampling schemes for particle filtering" by Douc, Randal, and Olivier Cappé, *Proceedings of the 4th International Symposium on Image and Signal Processing and Analysis*, IEEE (2005). Other examples of resampling algorithms are also described in that paper. Next, the sequence-mining software can identify a group of k-length sequences that are present in the N data entries, for example by applying a shuffling algorithm to each respective data entry of the N data entries. An example of the shuffling algorithm can be a Knuth shuffling algorithm or a variant thereof. The Knuth shuffling algorithm (which also sometimes referred to as the "Fisher-Yates shuffle") is an iterative process for identifying some or all possible permutations of the items in a data entry, where each iteration involves randomly drawing items from the data entry to generate a permutation of those items. Having identified the group of k-length sequences present in the N data entries, the sequence-mining software can determine a respective frequency of each k-length sequence in the group of k-length sequences. The frequency of a particular k-length sequence can be determined by dividing (i) how many times the particular k-length sequence is present in the group of k-length sequences by (ii) a total number of k-length sequences that are present in the group of k-length sequences. Finally, the sequence-mining software can select the candidate sequences from the group of k-length sequences based on the frequency of each k-length sequence in the group. For example, the sequence-mining software can select, as the candidate sequences, the k-length sequences in the group that have corresponding frequencies above a predefined threshold.

After identifying the candidate sequences, the sequence-mining software can implement the second step of the sequence mining process to verify whether each of the candidate sequences has at least a minimum level of support (a) in the data set, where the minimum level of support may be predefined by a user. For example, the sequence-mining software can determine the support level for a candidate sequence by dividing (i) the number of data entries in the data set in which the candidate sequence is present by (ii) the total number of data entries in the data set. The sequence-mining software can then compare the support level for the candidate sequence to a predefined threshold that is associated with the minimum level of support, to determine whether the support level for the candidate sequence is above the predefined threshold. If so, the candidate sequence has at least the minimum level of support and can be flagged as a frequent sequence for the user. If not, the candidate sequence can be discarded as an infrequent sequence. This verification process can be repeated for each of the candidate sequences, until some or all of the candidate sequences have been verified.

The improved techniques described above can consume significantly fewer computing resources than alternative approaches. For example, some conventional sequence-mining software implement the Sequential PAttern Discovery using Equivalence classes (SPADE) algorithm to perform sequence mining. SPADE relies on the fact that a longer sequence will not be frequent if its shorter sub-sequence ancestors are not frequent. As a result, SPADE has to derive (k−1)-length frequent sequences before deriving k-length frequent sequences, which consumes a significant amount of time and computing resources. For example, a computer may execute SPADE to perform sequence mining on a data set that has 1 million rows with 900 identical transactions. There are also 100 other transactions that are at least partially different from the 900 identical transactions. In this example, each transaction has 1,000 unique items. Because the 900 identical transactions are the same, any sequence pattern of any length from the 900 identical transactions has the minimum support of ≥0.9. If SPADE is directed to derive 10-length frequent sequences having a minimum support that is no less than 0.9, SPADE would have to produce C(1000, 1)+C(1000, 2)+ . . . +C(1000, 9) sequences before deriving the full C(1000, 10), where C(n,k) can denote the number of k-combinations from a given set of n items. This amounts to 2.63e+23 total sequences. Given this massive number of sequences, SPADE often runs out of computing resources and fails, without returning any result at all. In contrast, the improved techniques described herein do not suffer from the hierarchical dependency of SPADE. Rather, the improved techniques described herein sample the desired k-length sequence patterns directly, without the knowledge of (k−1)-length sequences or (k+1)-length sequences. This results in less computational overhead, which translates into reduced execution time and consumption of computing resources.

Of course, if information about the (k−1)-length sequences or (k+1)-length sequences was already known, the improved techniques described herein could be implemented in a different way to take advantage of the knowledge and obtain a faster or more accurate result. For example, if $\Omega_k$ denotes all k-length sequences that satisfy the minimum support requirement and the $\Omega_{k-1}$ is known, then a candidate sequence that is determined using the improved techniques can be verified based on whether all of its k children of (k−1)-length sequences belong to $\Omega_{k-1}$. If not, then this candidate sequence cannot be a solution and it is not necessary to determine its support level. Thus, the verification step of the sequence mining process can be skipped. On the other hand, if all k-length children sequences of $\Omega_{k+1}$ are solutions, then a candidate sequence determined using the improved techniques can be verified against those children first.

The improved techniques described herein can also consume fewer computing resources and improve sequence mining as compared to SPADE in other ways. For example, the improved techniques may only perform the verification step on the candidate sequences drawn from the N data entries. Because the number of candidate sequences analyzed in the verification step is bounded by the size of N, so is the resource consumption associated therewith. In contrast, SPADE lacks any such bounds and consequently consumes significantly more computing resources and takes significantly longer to execute than the improved techniques. As another example, the improved techniques can also be easily executed in parallel on a group of processing devices. This parallelism can significantly reduce execution time, improve performance (e.g., by distributing resource consumption), and reduce susceptibility to computing failures.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for performing computerized sequence-mining on large data sets according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in performing computerized sequence-mining, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data to perform performing computerized sequence-mining.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing computerized sequence-mining.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for performing computerized sequence-mining. For example, the computing environment 114, a network device 102, or both can implement one or more versions of the processes discussed with respect to any of the figures.

Figure 2:
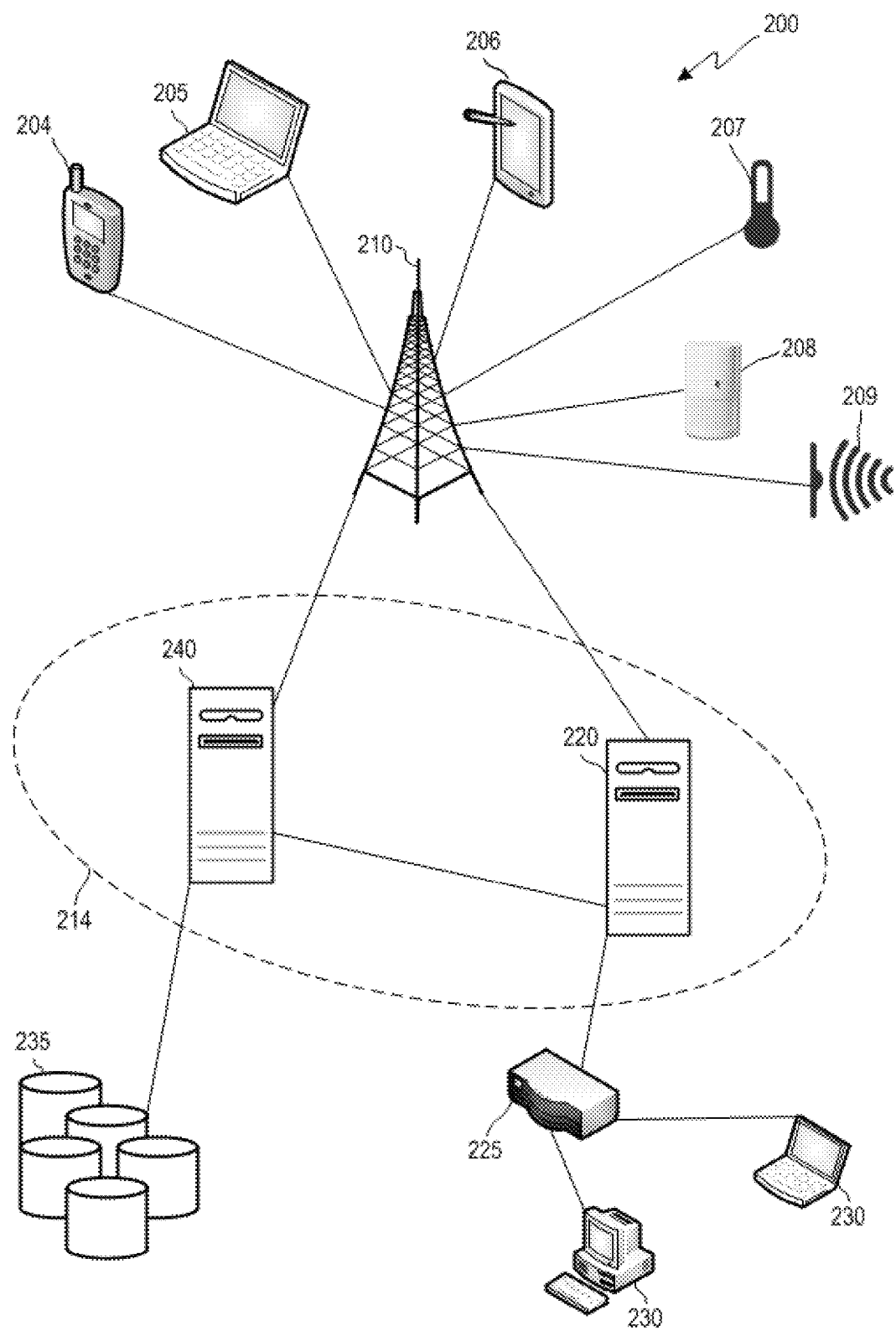
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., computerized sequence-mining).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Because network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for performing computerized sequence-mining on data, the computing environment 214 can perform a pre-analysis of the data. The pre-analysis can include determining whether the data is in a correct format and, if not, reformatting the data into the correct format.

Figure 3:
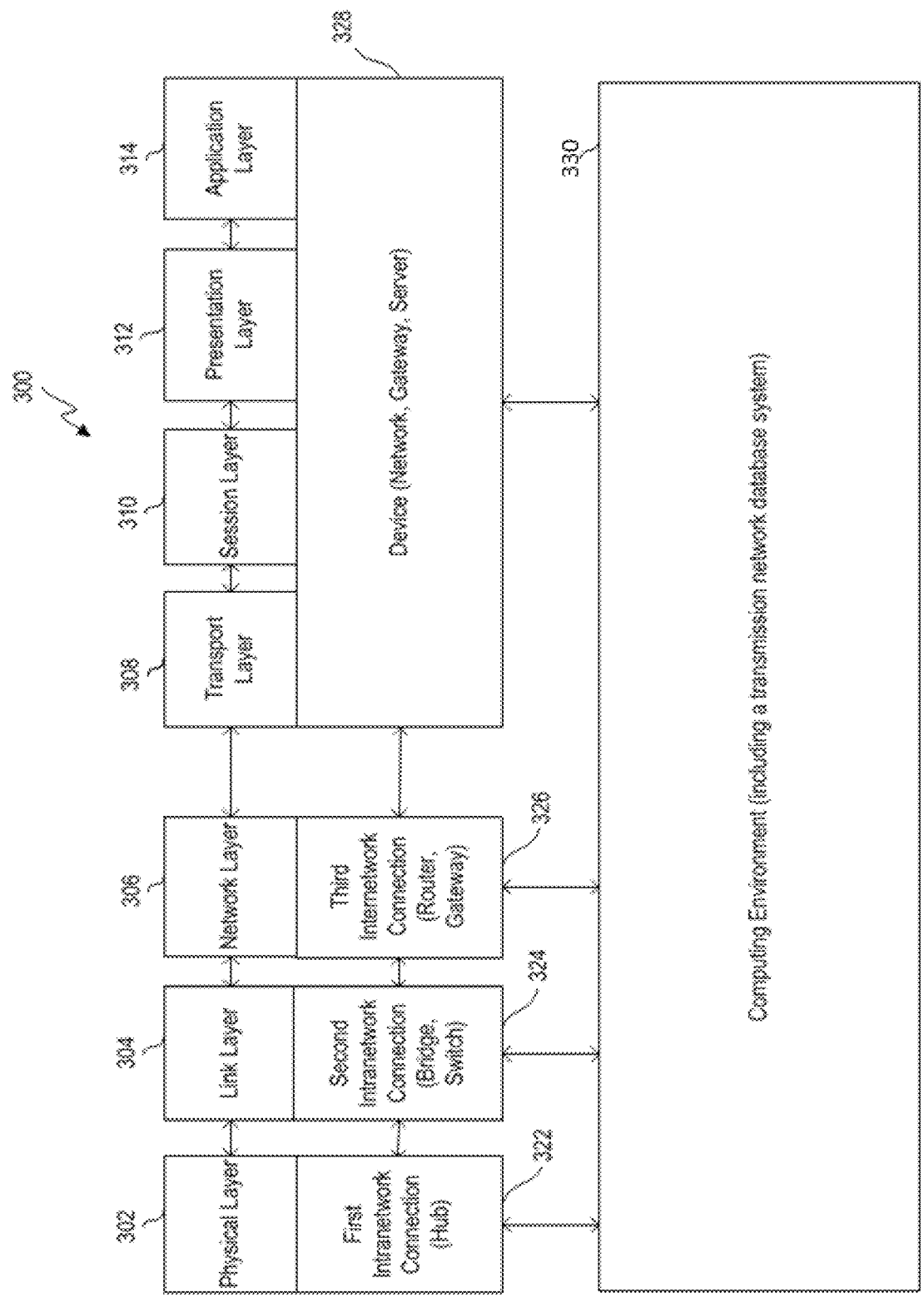
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for performing computerized sequence-mining, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for performing computerized sequence-mining.

Figure 4:
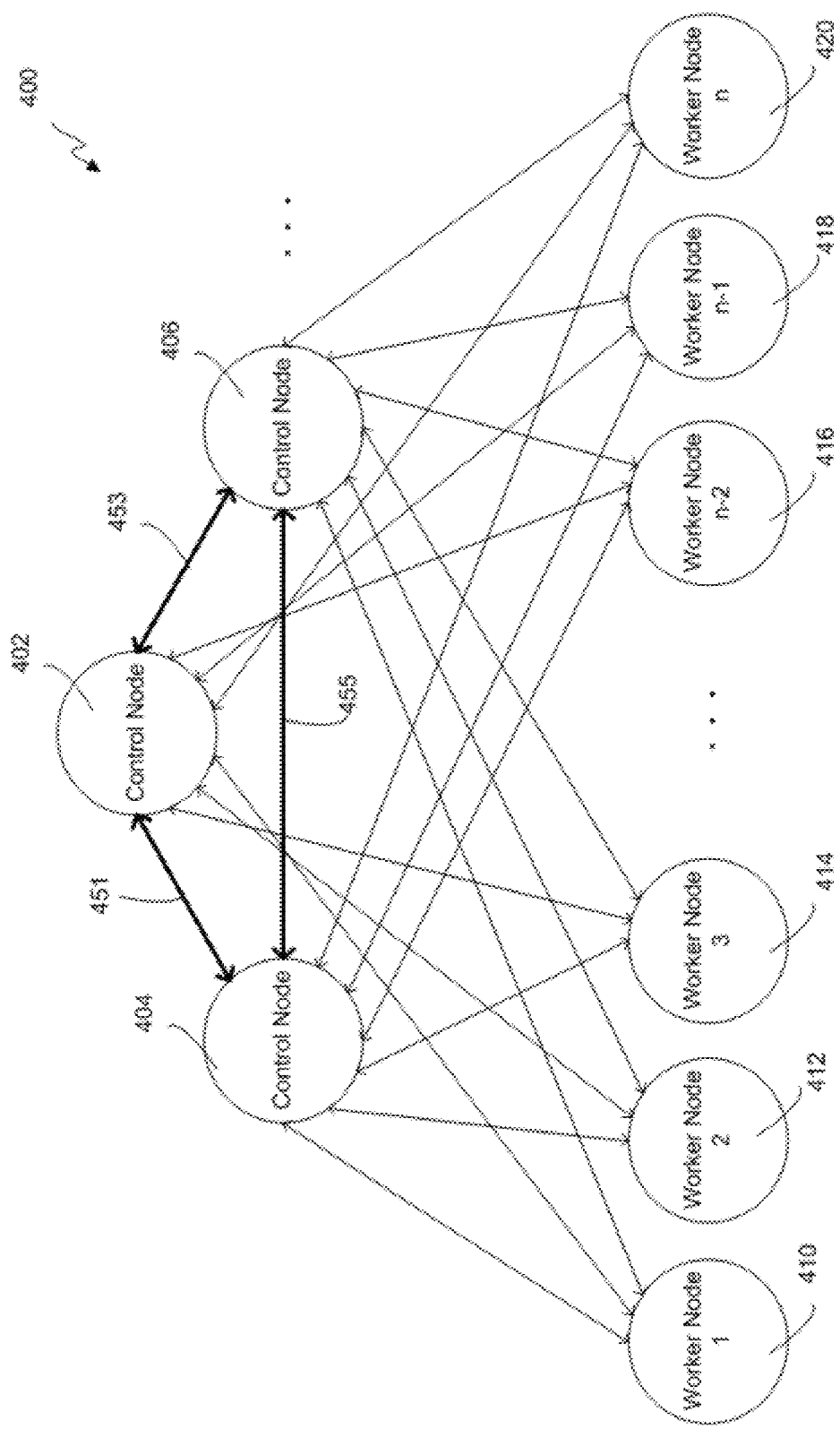
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to performing computerized sequence-mining. The project may include the data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for performing computerized sequence-mining can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform computerized sequence-mining using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Because each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to perform computerized sequence-mining.

Figure 5:
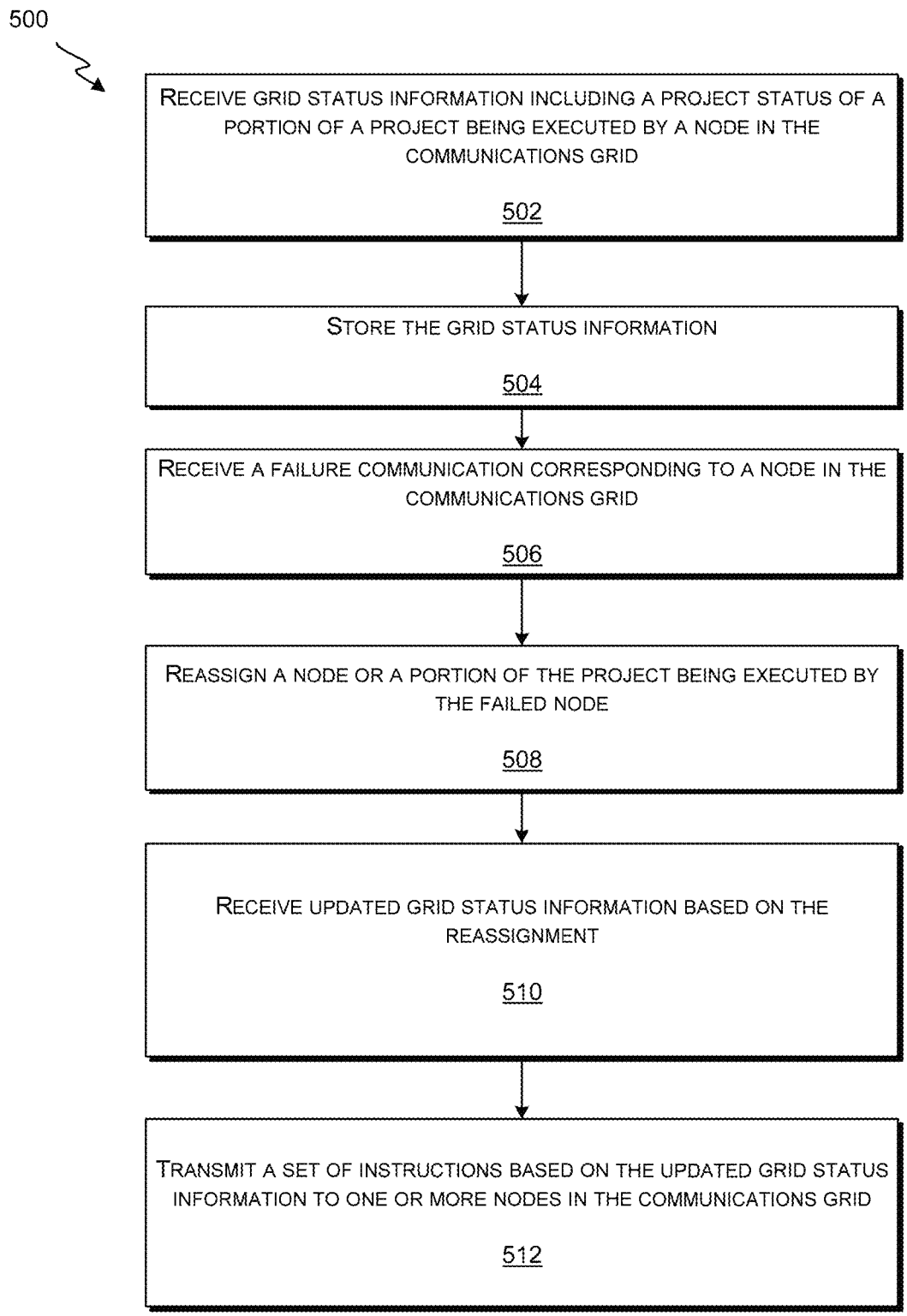
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
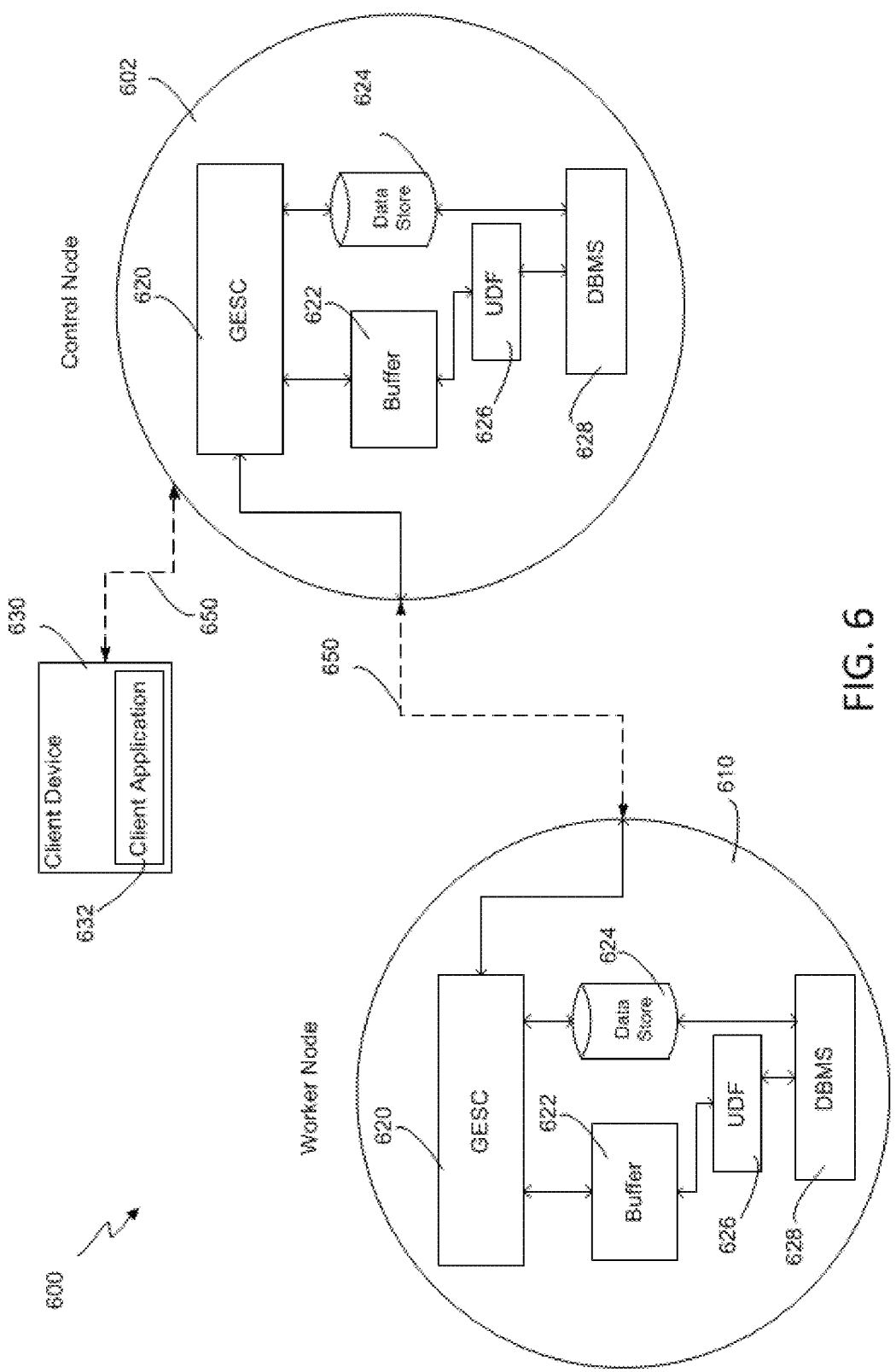
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
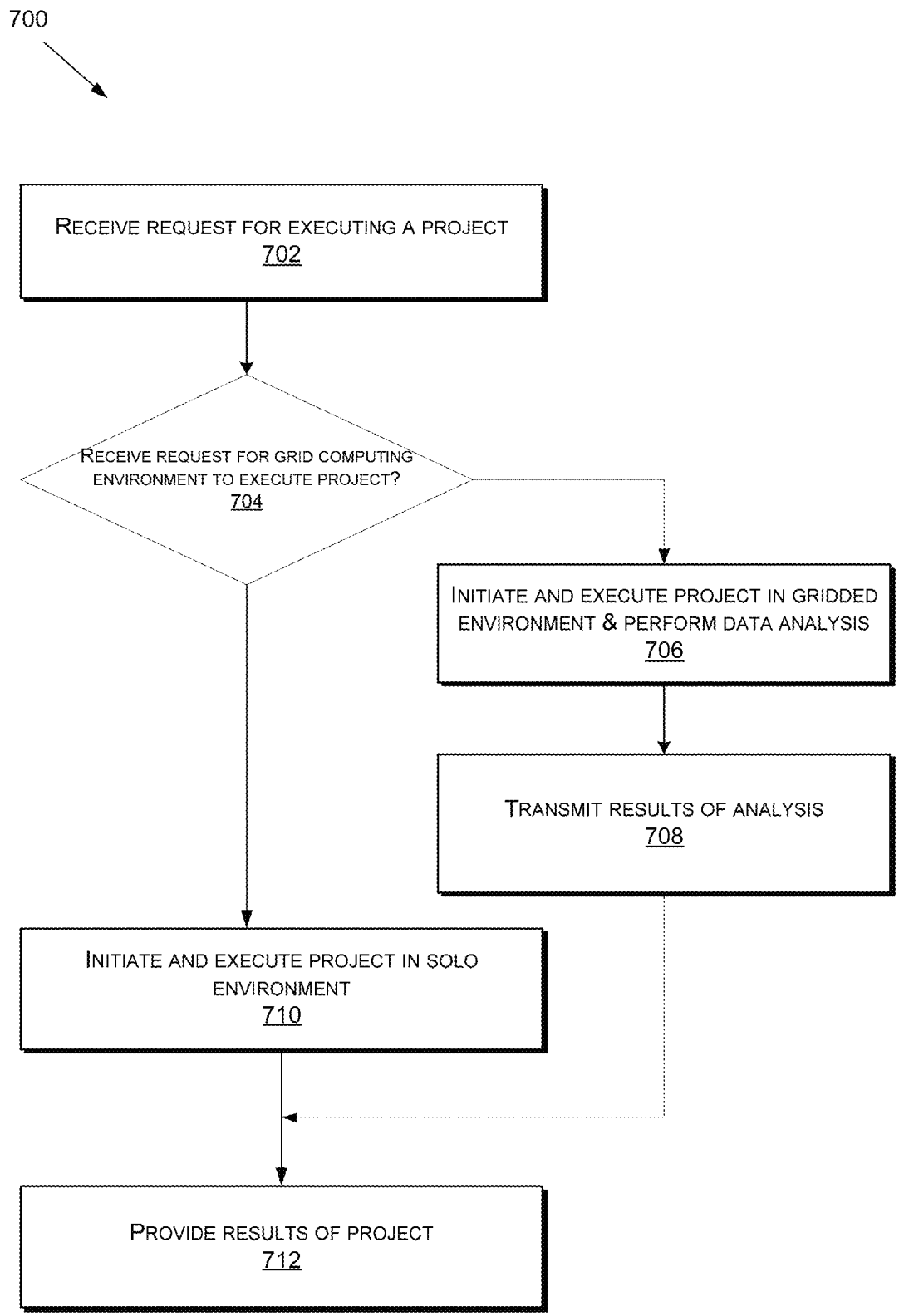
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
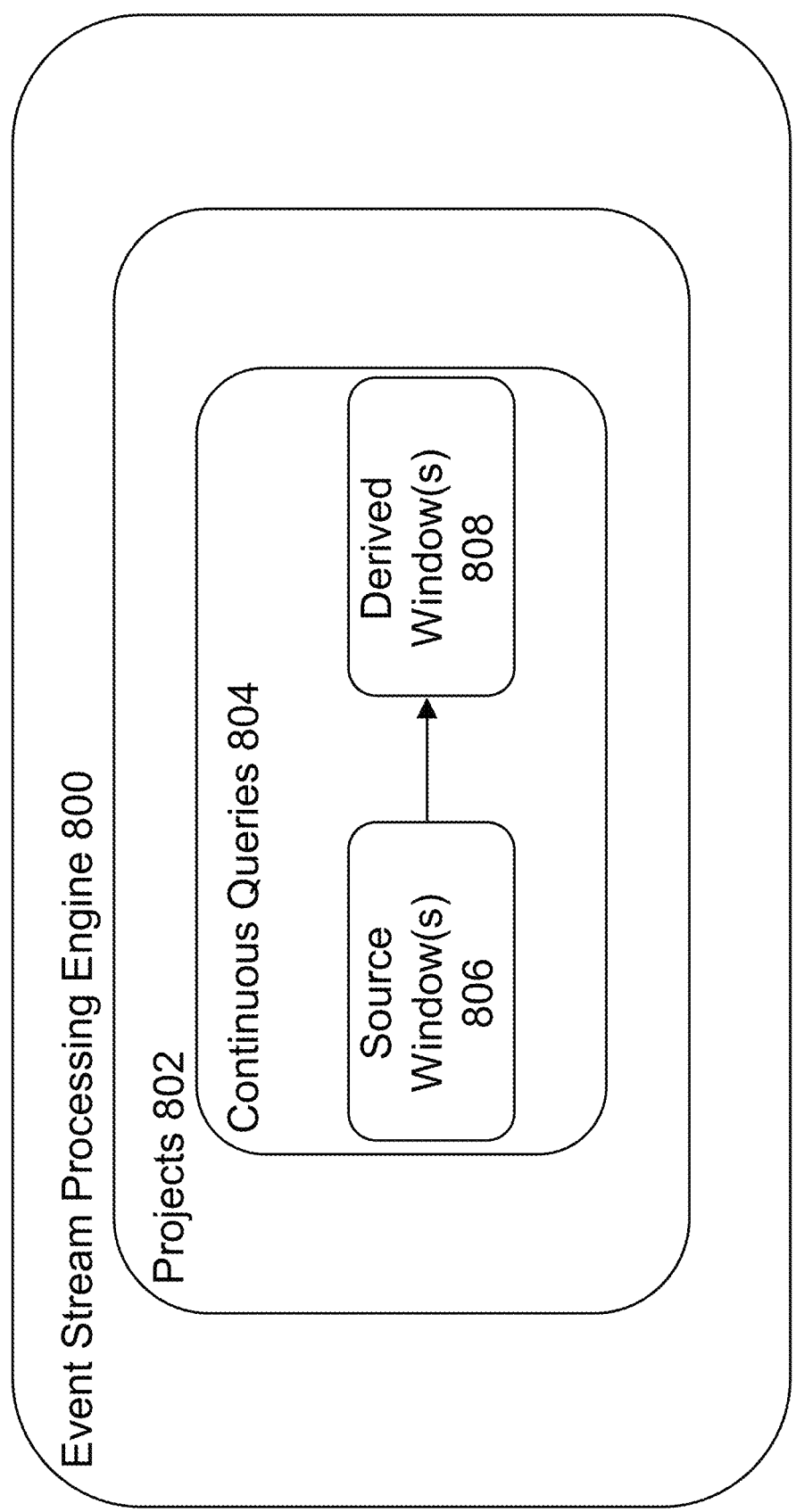
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
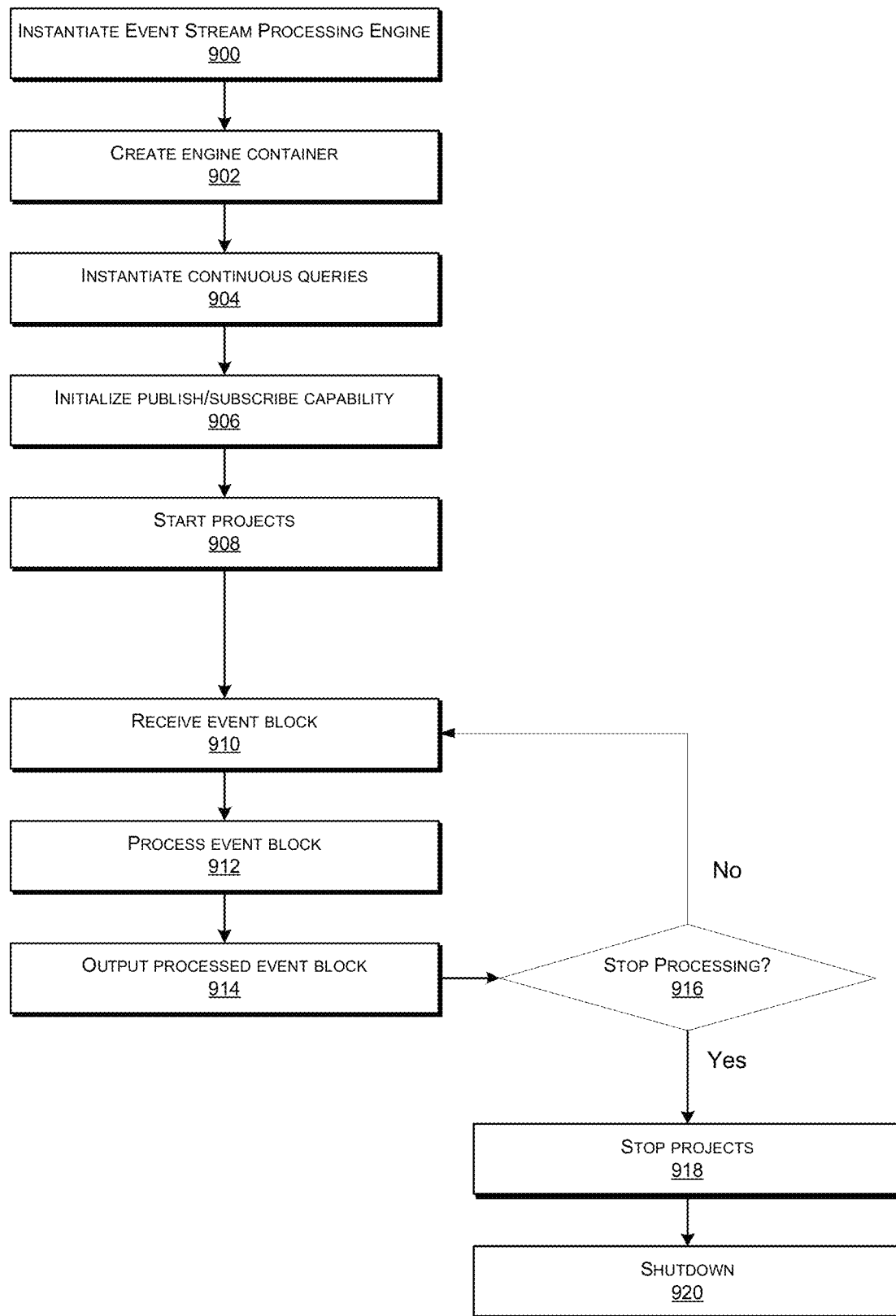
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
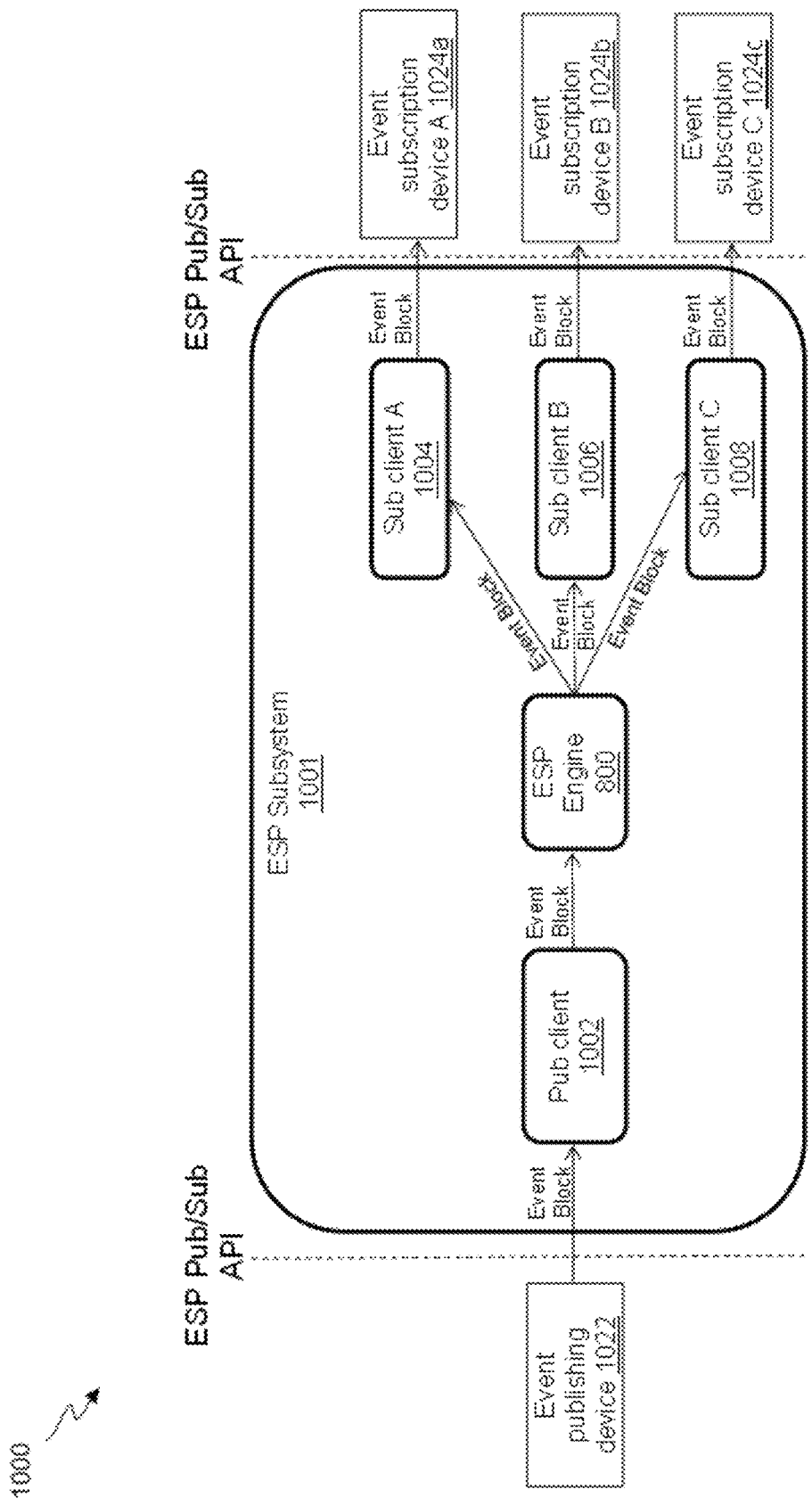
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
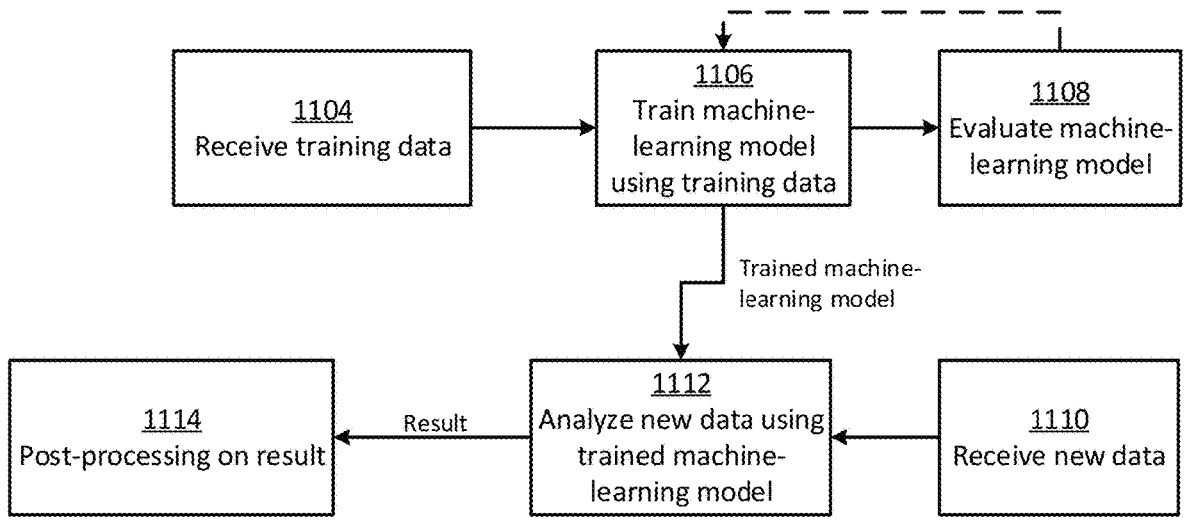
FIG. 11 depicts a flow chart of an example of a process for generating and using a machine learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation data set can be obtained, for example, via user input or from a database. The evaluation data set can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation data set, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
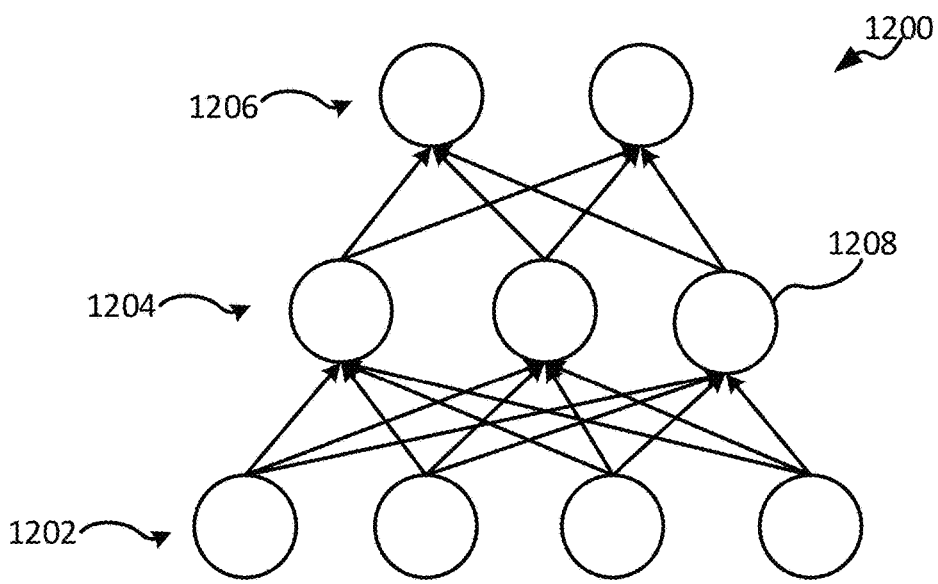
FIG. 12 depicts a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
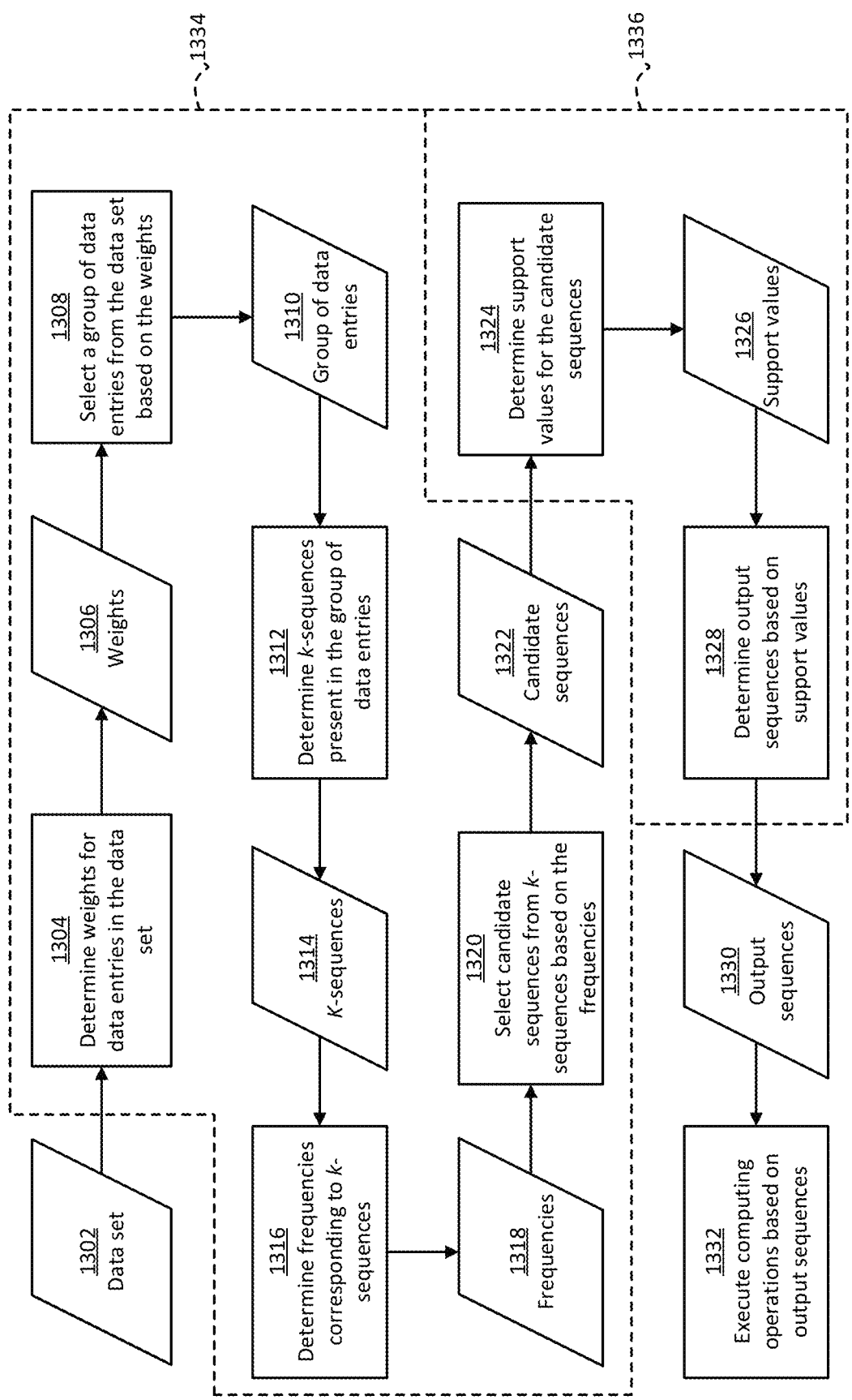
FIG. 13 depicts an example of a sequence mining process according to some aspects of the present disclosure.

FIG. 13 depicts an example of a sequence mining process according to some aspects of the present disclosure. In some examples, the sequence mining process can be implemented using any of the systems or techniques described above. Although the sequence mining process has a particular order of operations in FIG. 13, it will be appreciated that other examples may involve more operations, fewer operations, different operations, or a different order of the operations than is shown in FIG. 13.

The sequence mining process can begin with a processing device receiving a data set 1302 from any suitable source, such as a database or a remote computing device. The data set 1302 may be large and include millions of rows of data, with each row of data being a data entry in the data set 1302. In some examples, the data set 1302 may be in the form of a set of tuples<SID, EID, Items>, where SID is a sequence identifier, EID is a time indicator, and items is a list of one or more items.

One example of such a data set 1302 is shown in FIG. 14. In this example, the data set 1302 includes data entries (e.g., rows) that are first organized into groups by SID, and then organized within their groups by EID. Each data entry has a list of items, such as a list of network ports accessed by a user over the course of a network connection. While the exemplary data set 1302 shown in FIG. 14 only has a few data entries for simplicity, it will be appreciated that real-world examples may include millions of data entries. Also shown in FIG. 14 are examples of various k-length frequent sequences 1404, along with a count of SID groups in which those frequent sequences appear. A frequent sequence, in this example, may be a k-length sequence that has a support level ≥0.5. The counts exclude overlaps, such that a particular sequence is only counted once per SID. While the exemplary k-sequences shown in FIG. 14 are relatively short in length (e.g., four or less) for simplicity, it will be appreciated that real-world examples may involve significantly larger k-sequences, such as 10-sequences. For example, it may be desirable to identify 10-sequences in the data set 1302 for detecting a complex cybersecurity event such as a network intrusion event by a malicious entity (e.g., a computer hacker). And conventional sequence-mining software may consume significant amounts of computing resources to identify such longer k-length sequences in larger data sets. But some examples of the present disclosure can execute a two-step process designed to reduce computational overhead and resource consumption, as described in greater detail below with respect to FIG. 13.

As shown in FIG. 13, the two-step process can include a candidate selection step 1334 and a candidate validation step 1336. Each of those steps can include the sub-operations shown in the corresponding dashed boxes of FIG. 13. These sub-operations will now be described in turn below.

Figure 15:
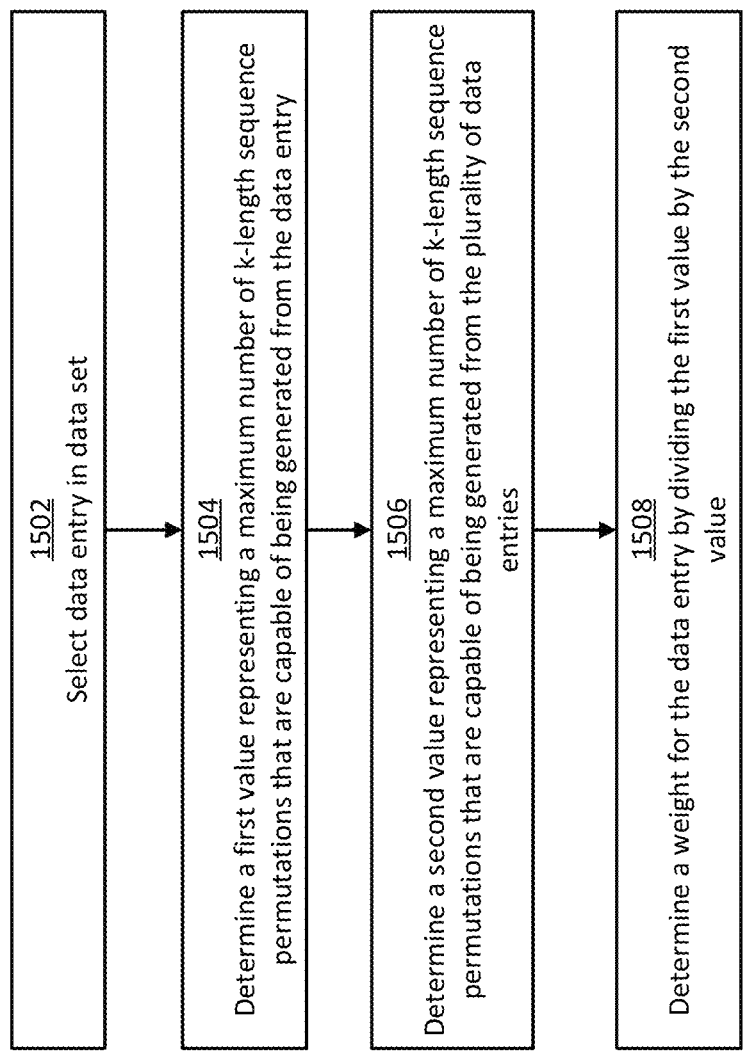
FIG. 15 depicts an example of a process for determining weights for data entries according to some aspects of the present disclosure.

In operation 1304, the processing device determines weights 1306 for the data entries in the data set 1302. The weights 1306 can be determined for the data entries using any number and combination of techniques. One exemplary approach is shown in FIG. 15, which begins at operation 1502. At operation 1502, the processing device selects a data entry from the data set 1302. At operation 1504, the processing device determines a first value associated with the data entry. The first value can represent the maximum number of k-length sequence permutations that are capable of being generated from the data entry. For example, the processing device can determine that a particular data entry can have a maximum of 66 possible permutations of a 10-length sequence. This may be calculated as $C(n, 10)=n!/(10!(n-10)!)$, where n=12. At operation 1506, the processing device determines a second value associated with the data set 1302. The second value can represent the maximum number of k-length sequence permutations that are capable of being generated from some or all of the data entries in the data set 1302. For example, the processing device can determine that there is a maximum of 297 possible permutations of a 10-length sequence across all of the data entries in the data set 1302. At operation 1508, the processing device determines a weight for the data entry by dividing the first value by the second value. For example, the processing device can divide 66 by 297 to obtain a weight of 0.22 for the data entry. The processing device can repeat this process for each data entry to determine a corresponding weight. Of course, other techniques may additionally or alternatively be used to determine the weight for a data entry.

In operation 1308, the processing device selects a group of data entries 1310 from the data set 1302 based on the weights 1306. The group can include N data entries. The processing device can select the group of data entries 1310 from the data set 1302 using any number and combination of techniques. For example, the processing device can select the N data entries by executing a resampling algorithm based on the weights 1306. The resampling algorithm may be performed with replacement.

In operation 1312, the processing device determines one or more k-sequences 1314 present in the group of data entries 1310. The sequence length (k) may have been previously selected by a user. The processing device can determine the one or more k-sequences 1314 present in the group of data entries 1310 using any number and combination of techniques. For example, the processing device can determine the k-sequences 1314 by executing a shuffling algorithm, such as a Knuth shuffling algorithm. A Knuth shuffling algorithm can randomly shuffle elements in an array to generate a list of some or all possible permutations of those elements. As applied here, the Knuth shuffling algorithm can randomly shuffle the items in a data entry to generate a list of some or all possible permutations of those items. The list can then be analyzed by the processing device to identify one or more k-sequences present in the data entry. This process can be repeated for each data entry, to enable the processing device to identify some or all of the k-sequences 1314 present in the group of data entries 1310.

In operation 1316, the processing device determines frequencies 1318 of the k-sequences in the group of k-sequences 1314. The processing device can determine the frequency of a particular k-sequence in the group 1314 based on the number of instances of the particular k-sequence that are present in the group 1314. For example, the processing device can determine the frequency of a particular k-sequence in the group 1314 by dividing (i) the number of times that the k-sequence is present in the group 1314 by (ii) the total number of k-sequences present in the group of k-sequences 1314. The processing device can repeat this process for each k-sequence, to determine a frequency of each k-sequence in the group 1314.

In operation 1320, the processing device selects one or more candidate sequences 1322 from among the group of k-sequences 1314 based on the frequencies 1318 corresponding to the group of k-sequences 1314. For example, the processing device can sort the k-sequences in the group 1314 by frequency. The processing device can then compare the frequencies of the k-sequences to a predefined threshold to determine which k-sequences have corresponding frequencies that are above or below the threshold. As one example, the processing device can select some or all of the k-sequences 1314 that have corresponding frequencies greater than or equal to the predefined threshold as the candidate sequences 1322. Alternatively, the processing device can select some or all of the k-sequences 1314 that have corresponding frequencies less than or equal to the predefined threshold as the candidate sequences 1322. The predefined threshold may be preselected by a user.

At the end of operation 1320, the processing device has determined candidate sequences 1322 that may or may not have at least a minimum support in the data set 1302. To determine whether each of the candidate sequences 1322 has a sufficient level of support in the data set 1302, the processing device can next execute the candidate validation step 1336, which begins at operation 1324.

In operation 1324, the processing device determines support values 1326 for the candidate sequences 1322. In some examples, the processing device can determine a support value 1326 for a candidate sequence by dividing (i) the total number of data entries in the data set 1302 that include the candidate sequence by (ii) the total number of data entries in the data set 1302. For example, if the candidate sequence is present in 1000 data entries in the data set 1302, and there are one million total data entries in the data set 1302, then the support for the candidate sequence would be 1000/1,000,000=0.001. In other examples, the processing device can determine the support value in other ways. For example, the support value for the candidate sequence may simply be the total number of data entries in the data set 1302 that include the candidate sequence. The selected approach can be repeated for each of the candidate sequences 1322 to determine a corresponding support value for the candidate sequence.

In some examples, the process of identifying a candidate sequence 1322 in the data set 1302 can be considered a pattern matching problem, where the candidate sequence 1322 is the pattern to be matched in the data set 1302. For example, the candidate sequence $\{x_1, \ldots, x_k\}$ can be considered a pattern that can be represented as the regular expression $x_1((x)^*)x_2((x)^*) \ldots x_k((x)^*)$. In this regular expression, $((x)^*)$ can be a sequence of any length having any number of items. The data entries in the data set 1302 can also be considered long sequences, $\{y_1, \ldots, y_T\}$, where $x_i, y_j \in \theta$, and where $\theta$ corresponds to the set of all possible items. Using these principles, pattern matching algorithms may be executed to determine how many times a given candidate sequence is present in the data set 1302.

In one particular example, the processing device can execute a linear-matching algorithm to determine one or more of the support values 1326 for one or more of the candidate sequences 1322. One type of a linear-matching algorithm can be a linear time pattern matching algorithm, which can find the occurrence of a pattern in a string in linear time. Such linear-matching algorithms may consume more time and computing resources to complete. For example, a linear-matching algorithm may consume $O(T)$ time and $O(1)$ memory to complete, where T is the total number of items in a data entry.

As another example, the processing device can execute a constant-matching algorithm to determine one or more of the support values 1326 for one or more of the candidate sequences 1322. In some such examples, the constant-matching algorithm can pre-process a data entry in the data set 1302 to transform it into a new data structure in the form of a matrix. The rows of the matrix can indicate some or all possible items in the data entry. The columns of the matrix can be arranged such that the items' positions are in time order. After transforming the data entry into the matrix, the matrix can be analyzed using the constant-matching algorithm to determine whether the target candidate sequence 1322 is present therein. Using this approach, some or all of the pre-processing of data structures and the main searching algorithm can be implemented in parallel on multiple processing devices. As a result, the constant-matching algorithm can consume significantly less time than a linear-searching algorithm. For example, a constant-matching algorithm may consume O(1) time and O(sT) memory to complete, where s is the number of all possible items.

Figure 16:
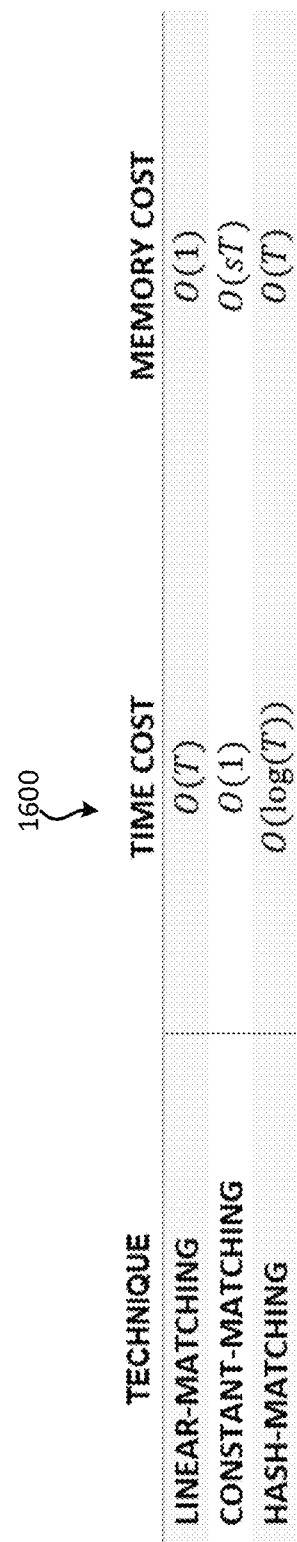
FIG. 16 depicts a data table that includes examples of computing-resource costs associated with using different pattern-matching algorithms according to some aspects of the present disclosure.

As still another example, the processing device can execute a hash-matching algorithm to determine one or more of the support values 1326 for one or more of the candidate sequences 1322. In some such examples, the hash-matching algorithm can convert a target candidate sequence into its hash value. The hash-matching algorithm can also convert the items in a target data entry into their hash values. The hash-matching algorithm can then execute a matching process using these hash values. In general, the hash-matching algorithm can be faster than a linear-searching algorithm. But, other aspects of the hash-matching algorithm may make it slower than the constant-matching algorithm. Thus, the hash-matching algorithm may serve as a balance between the linear-searching algorithm and the constant-matching algorithm, in terms of computing resource consumption. For example, a hash-matching algorithm may consume O(log (T)) time and O(T) memory to complete. A summary of the resource consumption associated with all three matching algorithms is shown in table 1600 of FIG. 16. Although these three specific examples are provided for illustrative purposes, it will be appreciated that the processing device can execute any number and combination of the matching algorithms to determine the support values 1326 for the candidate sequences 1322.

In operation 1328, the processing device determines output sequences 1330 based on the support values 1326. The output sequences 1330 may be a subset of the candidate sequences 1322 that are selected based on their support values. For example, the processing device can compare the support values 1326 of the candidate sequences 1322 to a predefined threshold to determine which candidate sequences have corresponding support values that are above or below the threshold. The predefined threshold can correspond to a minimum level of support (a) for the candidate sequences to be considered frequent sequences. An example of the predefined threshold may be 0.1 (e.g., 10% support) or another value selected by a user. Candidate sequences 1322 that have corresponding support values above the predefined threshold may be selected as the output sequences 1330. Such output sequences 1330 may be considered frequent sequences of the data set 1302. Alternatively, the processing device can select some or all of the candidate sequences 1322 that have corresponding support values less than or equal to the predefined threshold as the output sequences 1330. Such output sequences 1330 may be considered infrequent sequences in the data set 1302.

In operation 1332, the processing device executes one or more computing operations based on the output sequences 1330. One examples of such a computing operation can involve transmitting an output signal indicating the output sequences 1330. For example, the processing device can transmit an output signal indicating the output sequences 1330 to one or more electronic devices, such as laptop computers, desktop computers, servers, pumps, control systems, Internet of Things (IOT) devices, or mobile phones. The processing device may transmit the output signal as an electronic communication over one or more networks (e.g., the Internet). As another example, the processing device can transmit an output signal in the form of a display signal configured to cause a display device to depict a graphical user interface that includes the output sequences 1330. Examples of the display device can include a liquid crystal display (LCD) or a light-emitting diode (LED) display. A user may view the graphical user interface on the display device and take appropriate action based on the output sequences 1330.

In some examples, the processing device can execute the computer operations shown in FIG. 18 based on the output sequences 1330. As shown in FIG. 18, the processing device can detect an event based on the output sequences 1330 in operation 1802. Examples of the event may be a problem relating to network security, network traffic, application execution, or usage of computing resources. For example, the processing device can detect a potential network intrusion based on a sequence of port connections listed in the output sequences 1330. As another example, the processing device can detect a potential bottleneck in network traffic based on a sequence of network connections to a service listed in the output sequences 1330. As still another example, the processing device can detect a potential application failure based on a sequence of memory accesses listed in the output sequences 1330. As yet another example, the processing device can detect a potential bottleneck in computing-resource consumption based on a sequence of software services that consume the computing resources. Other types of events may also be detected by the processing device, such as events relating to the purchasing of items (e.g., physical products, software, or videos) from an online store or the consumption of materials (e.g., wood, stone, glass, metals, etc.).

In operation 1804, the processing device outputs a notification for a user about the event. In some examples, the notification may be transmitted over one or more networks to a client device associated with the user. For example, the processing device can transmit an e-mail or SMS message indicating the event to the user's client device. As another example, the processing device can output an auditory, haptic, or visual notification to the user indicating the event.

Notifying the user about the event can enable the user to take appropriate action with respect to the event (e.g., to mitigate a problem associated with the event). For example, the user may execute antivirus software or cybersecurity software in response to an event involving an attempted network intrusion in an effort to mitigate said intrusion. As another example, the user may reroute network traffic in response to an event involving a network traffic bottleneck in an effort to mitigate the bottleneck. As still another example, the user may deploy additional virtual machines or physical machines to a network in response to an event involving a resource consumption bottleneck in an effort to mitigate the bottleneck.

In some examples, one or more of the processes described above can be iterated any number of times in sequence or in parallel. For example, the sequence mining process shown in FIG. 13 can be iterated multiple times (e.g., in a parallel manner across a distributed architecture) and the resulting output sequences can be combined. One example of this is shown in FIG. 19, which begins at operation 1902. In operation 1902, the processing device executes some or all of the process shown in FIG. 13 to generate a first set of output sequences. In operation 1904, the processing device executes some or all of the process shown in FIG. 13 to generate a second set of output sequences. Although operations 1902-1904 are shown in sequence, in practice they may be implemented in sequence or in parallel. In operation 1906, the processing device generates combined output results based on the first set of output sequences and the second set of output sequences. For example, the processing device can combine some or all of the first set of output sequences with some or all of the second set of output sequences to generate the generates combined output results. In operation 1908, the processing device transmits the combined output results, for example to one or more electronic devices. Because the sequence mining process of FIG. 13 may be repeated multiple times to generate a more complete set of output results, the sequence mining process may be considered an "anytime algorithm," whereby the results of different runs with different random seeds can be combined.

Some exemplary experimental results will now be described below. But, it will be appreciated that the following discussion is intended to be illustrative and non-limiting.

Experiments #1-6: In the first six experiments described below, the enhanced sequence-mining process was applied to an input data set that included a 22-million row data table that included roughly 215 thousand transactions. The data table was divided into four sub-tables:

A first table that included all transactions ending with the letter "N", which constituted roughly 70 thousand transactions;

A second table that included all transactions ending with the letter "J", which constituted roughly 70 thousand transactions;

A third table that included all transactions ending with the letter "M", which constituted roughly 69 thousand transactions; and A fourth table that included all remaining transactions.

The enhanced sequence-mining process was then applied to the first three tables (the fourth table was not used in these experiments), with the goal being to identify 10-sequences with a support level ≥10%.

Experiment #1: In the first experiment, the enhanced sequence-mining process was applied to the data tables on a single machine having an Intel® Core™ j7-6700 CPU and 32 gigabytes (GB) of memory. For each data table, the sequence mining process first identified 1 million 10-sequences, determined the frequency of those 10-sequences, and chose the top T 10-sequences as the candidate sequences. The value of T was 100, 100, and 2000 for the first table, second table, and third table, respectively. The sequence mining process then performed the verification step to determine which of the candidate sequences have the required minimum support. In this experiment, the verification step used a linear-matching algorithm. From the verification step, the sequence mining process identified 58 frequent sequences in the first table, 25 frequent sequences in the second table, and 1824 frequent sequences in the third table. It took roughly 7 hours to find the roughly 2000 solutions in the third table.

Experiment #2: In a second experiment, the enhanced sequence-mining process was again applied to the data tables on the same machine having an Intel® Core™ i7-6700 CPU and 32 gigabytes (GB) of memory. But in this experiment, the verification step used a constant-matching algorithm. With this change, it only took roughly 1.5 hours to identify the nearly 2000 solutions in the third table, rendering this approach roughly five times faster than the linear-matching approach of the first experiment.

Experiment #3: In a third experiment, the enhanced sequence-mining process was applied to the data tables using a distributed 140-machine grid with 5,752 CPUs and 48.71 terabytes (TB) of memory. For each data table, the sequence mining process first identified 1 million 10-sequences, determined the frequency of those 10-sequences, and analyzed all of the 10-sequences (e.g., one million sequences) as the candidate sequences. The sequence mining process then performed the verification step to determine which of the candidate sequences have the required minimum support. In this experiment, the verification step used a linear-matching algorithm. From the verification step, the sequence mining process identified 9605 frequent sequences in the first table, 1324 frequent sequences in the second table, and 17223 frequent sequences in the third table. It took roughly 9 hours, 9 hours, and 24 hours to apply the distributed-computing version of the enhanced sequence-mining process to the first table, second table, and third table, respectively.

Experiment #4: In a fourth experiment, the enhanced sequence-mining process was again applied to the data tables using a distributed 140-machine grid with 5,752 CPUs and 48.71 terabytes (TB) of memory. But in this experiment, the verification step used a constant-matching algorithm. With this change, it only took roughly 30 minutes, 15 minutes, and 15 minutes to identify the same number of solutions in the first table, second table, and third table, respectively, rendering this approach roughly 40 times faster than the linear-matching approach of the third experiment.

In general, the enhanced sequence-mining process can rapidly identify candidate sequences (e.g., 6 minutes to identify 3,000,000 candidates), so the resource-consumption bottleneck is the second verification step. On a single machine, the verification step takes about 5,400 seconds to calculate the support of 2,200 sequence candidates. Thus, the verification step determines about 0.4 candidates/second on a single machine and the CPU efficiency is 0.4 candidates/second per CPU. On a distributed grid with 4,080 CPUs, the verification step takes about 3,600 seconds to calculate the support of about 3,000,000 sequence candidates. Thus, the verification step determines about 833 candidates/second using the gird and the CPU efficiency is about 0.2 candidates/second per CPU. From these experiments, it is apparent that the distributed-computing version of sequence mining process can be about 2,000 times faster than the single-machine version, although it has about half the CPU efficiency. Further optimizations may even further improve speed and CPU efficiency. For example, the workload could be better balanced among the CPUs for improved efficiency and speed.

Experiment #5: In a fifth experiment, the enhanced sequence-mining process was applied to the data tables on a single machine having an Intel® Core™ j7-6700 CPU and 32 gigabytes (GB) of memory. In prior experiments, all of the items in a k-sequence were ordered by time and no two items were allowed to share the same point in time. But in this experiment, the k-sequences were allowed to include items that share the same point in time (e.g., items that have the same timestamp). This experiment also used the constant-matching algorithm for the verification step. It took about 2 hours to finish the same tasks as experiment #1 and experiment #2, rendering this approach roughly 25% slower than the approaches taken in those experiments in order to support the case of multiple items appearing at one point in time.

Experiment #6: In a sixth experiment, the enhanced sequence-mining process was applied to the data tables on the distributed 140-machine grid with the 5,752 CPUs and 48.71 terabytes (TB) of memory. But like experiment #5, the k-sequences were allowed to include items that share the same point in time. This experiment also used the constant-matching algorithm for the verification step. It took about 30 minutes, 20 minutes, and 30 to finish the same tasks as in experiment #4, rendering this approach roughly 30% slower than the approach taken in experiment #4 in order to support the case of multiple items appearing at one point in time.

Experiment #7: In a seventh experiment, the input data set included 1.2 million rows of transactions. From this input data set, a data table was created that included 16.6 thousand transactions. A conventional sequence-mining technique (the R package "arulesSequences") was applied to the data table to identify 5-sequences with support ≥5%, 10%, 20%, and 40%, respectively. Using the conventional sequence-mining technique, it was determined that there are 303,300 of such sequences having support ≥5%; 62,191 of such sequences having support 10%; 9,249 of such sequences having support ≥20%; and 1,155 of such sequences having support 40%. The number of solutions (Mo) identified using the conventional sequence-mining technique for each of the abovementioned levels of support served as baseline values against which later comparisons are made.

The enhanced sequence-mining technique described herein was also applied to the data table to identify 5-sequences with support ≥5%, 10%, 20%, and 40%, respectively. Because the number of solutions (M) identified using the enhanced sequence-mining technique depends on the number of samples (N), the number of solutions identified using the enhanced sequence-mining technique becomes closer to the baseline values as the number of samples grows.

A comparison of these two techniques is shown in table 1700 of FIG. 17. In table 1700, each major column 1702*a-d* corresponds to one of the abovementioned support levels and each row 1704*a-d* corresponds to a different number of samples (N). Each value of Mo corresponds to the baseline number of solutions identified using the conventional sequence-mining technique, and each value of M corresponds to the number of solutions identified using the enhanced sequence-mining technique. As shown, the number of solutions identified using the two techniques tends to converge as the number of samples (N) increases. This means that the accuracy of the enhanced sequence-mining technique can be roughly equivalent to the conventional sequence-mining technique, so long as a sufficient number of samples are chosen. In addition, the enhanced sequence-mining technique can handle larger k-sequences, such as sequences of length 10 or higher, whereas the conventional sequence-mining technique may fail. This can make the enhanced sequence-mining technique superior to the conventional sequence-mining technique in many circumstances.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processing devices; and
one or more memory devices including instructions that are executable by the one or more processing devices for causing the one or more processing devices to execute operations involving:
receiving a data set including a plurality of data entries;
determining a plurality of weights for the plurality of data entries, wherein each weight in the plurality of weights is determined for a respective data entry in the plurality of data entries;
selecting a group of data entries from among the plurality of data entries by executing a resampling algorithm with respect to the plurality of data entries based on the plurality of weights assigned to the plurality of data entries;
determining a plurality of k-length sequences present in the group of data entries, wherein each k-length sequence in the plurality of k-length sequences is determined by applying a shuffling algorithm to a respective data entry in the group of data entries;
determining a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences;
selecting a plurality of candidate sequences from among the plurality of k-length sequences by comparing the plurality of frequencies corresponding to the plurality of k-length sequences to a first predefined threshold;
determining a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries;
selecting a plurality of output sequences from among the plurality of candidate sequences by comparing the plurality of support values corresponding to the plurality of candidate sequences to a second predefined threshold; and
transmitting an output signal indicating the plurality of output sequences to one or more electronic devices.

2. The system of claim 1, wherein the one or more memory devices further include instructions that are executable by the one or more processing devices for causing the one or more processing devices to determine the plurality of weights by, for each data entry in the plurality of data entries:
determining a first value representing a maximum number of k-length sequence permutations that are capable of being generated from the data entry;
determining a second value representing a maximum number of k-length sequence permutations that are capable of being generated from the plurality of data entries; and
determining a weight for the data entry by dividing the first value by the second value.

3. The system of claim 1, wherein the one or more memory devices further include instructions that are executable by the one or more processing devices for causing the one or more processing devices to sort the plurality of k-length sequences by frequency prior to selecting the plurality of candidate sequences.

4. The system of claim 1, wherein the one or more memory devices further include instructions that are executable by the one or more processing devices for causing the one or more processing devices to:
select the plurality of candidate sequences from among the plurality of k-length sequences based on the plurality of candidate sequences having corresponding frequencies in the plurality of frequencies that exceed the first predefined threshold; and
select the plurality of output sequences from among the plurality of candidate sequences based on the plurality of output sequences having corresponding support values in the plurality of support values that exceed the second predefined threshold.

5. The system of claim 1, wherein the plurality of candidate sequences consists of fewer than all k-length sequences in the plurality of k-length sequences, and wherein the plurality of output sequences consists of fewer than all candidate sequences in the plurality of candidate sequences.

6. The system of claim 1, wherein the one or more memory devices further include instructions that are executable by the one or more processing devices for causing the one or more processing devices to:
determine the plurality of support values by executing a linear-matching process with respect to the plurality of candidate sequences.

7. The system of claim 1, wherein the one or more memory devices further include instructions that are executable by the one or more processing devices for causing the one or more processing devices to:
determine the plurality of support values by executing a constant-matching process with respect to the plurality of candidate sequences.

8. The system of claim 1, wherein the one or more memory devices further include instructions that are executable by the one or more processing devices for causing the one or more processing devices to:
determine the plurality of support values by executing a hash-matching process with respect to the plurality of candidate sequences.

9. The system of claim 1, wherein the shuffling algorithm is a Knuth shuffling algorithm.

10. The system of claim 1, wherein the one or more processing devices include a plurality of processing devices in a distributed computing environment, the plurality of processing devices being configured to execute at least some of the operations in parallel.

11. The system of claim 10, wherein at least some of the operations constitute a workload, and wherein the system is configured to balance the workload among the plurality of processing devices in the distributed computing environment.

12. The system of claim 11, wherein the distributed computing environment includes a cloud computing environment, a computing cluster, or a data grid.

13. The system of claim 1, wherein the one or more memory devices further include instructions that are executable by the one or more processing devices for causing the one or more processing devices to:
detect an event based on the plurality of output sequences; and
generate a notification to a user about the event.

14. The system of claim 13, wherein the event indicates a problem relating to network security, network traffic, application execution, or usage of computing resources.

15. The system of claim 1, wherein the one or more memory devices further include instructions that are executable by the one or more processing devices for causing the one or more processing devices to:
execute the operations to generate a first set of output sequences;
execute the operations again to generate a second set of output sequences that is different from the first set of output sequences;
generate combined output results by aggregating the first set of output sequences with the second set of output sequences; and
transmit the combined output results to the one or more electronic devices.

16. A method that includes operations, the operations comprising:
receiving, by one or more processing devices, a data set including a plurality of data entries;
determining, by the one or more processing devices, a plurality of weights for the plurality of data entries, wherein each weight in the plurality of weights is determined for a respective data entry in the plurality of data entries;
selecting, by the one or more processing devices, a group of data entries from among the plurality of data entries by executing a resampling algorithm with respect to the plurality of data entries based on the plurality of weights assigned to the plurality of data entries;
determining, by the one or more processing devices, a plurality of k-length sequences present in the group of data entries, wherein each k-length sequence in the plurality of k-length sequences is determined by applying a shuffling algorithm to a respective data entry in the group of data entries;
determining, by the one or more processing devices, a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences;

selecting, by the one or more processing devices, a plurality of candidate sequences from among the plurality of k-length sequences by comparing the plurality of frequencies corresponding to the plurality of k-length sequences to a first predefined threshold;

determining, by the one or more processing devices, a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries;

selecting, by the one or more processing devices, a plurality of output sequences from among the plurality of candidate sequences by comparing the plurality of support values corresponding to the plurality of candidate sequences to a second predefined threshold; and transmitting, by the one or more processing devices, an output signal indicating the plurality of output sequences to one or more electronic devices.

17. The method of claim 16, further comprising determining the plurality of weights by, for each data entry in the plurality of data entries:

determining a first value representing a maximum number of k-length sequence permutations that are capable of being generated from the data entry;

determining a second value representing a maximum number of k-length sequence permutations that are capable of being generated from the plurality of data entries; and determining a weight for the data entry by dividing the first value by the second value.

18. The method of claim 16, further comprising:

selecting the plurality of candidate sequences from among the plurality of k-length sequences based on the plurality of candidate sequences having corresponding frequencies in the plurality of frequencies that exceed the first predefined threshold; and selecting the plurality of output sequences from among the plurality of candidate sequences based on the plurality of output sequences having corresponding support values in the plurality of support values that exceed the second predefined threshold.

19. The method of claim 16, wherein the plurality of candidate sequences consists of fewer than all k-length sequences in the plurality of k-length sequences, and wherein the plurality of output sequences consists of fewer than all candidate sequences in the plurality of candidate sequences.

20. The method of claim 16, further comprising:

determining the plurality of support values by executing a linear-matching process with respect to the plurality of candidate sequences.

21. The method of claim 16, further comprising:

determining the plurality of support values by executing a constant-matching process with respect to the plurality of candidate sequences.

22. The method of claim 16, further comprising:

determining the plurality of support values by executing a hash-matching process with respect to the plurality of candidate sequences.

23. The method of claim 16, wherein the shuffling algorithm is a Knuth shuffling algorithm.

24. The method of claim 16, wherein the one or more processing devices include a plurality of processing devices in a distributed computing environment, the plurality of processing devices being configured to execute at least some of the method in parallel.

25. The method of claim 24, wherein the distributed computing environment includes a cloud computing environment, a computing cluster, or a data grid.

26. The method of claim 16, further comprising:

detecting an event based on the plurality of output sequences; and generating a notification to a user about the event.

27. The method of claim 26, wherein the event indicates a problem relating to network security, network traffic, application execution, or usage of computing resources.

28. The method of claim 16, further comprising:

executing the operations to generate a first set of output sequences;

executing the operations again to generate a second set of output sequences that is different from the first set of output sequences;

generating combined output results by aggregating the first set of output sequences with the second set of output sequences; and transmitting the combined output results to the one or more electronic devices.

29. A non-transitory computer-readable medium comprising program code that is executable by one or more processing devices for causing the one or more processing devices to perform operations involving:

receiving a data set including a plurality of data entries;

determining a plurality of weights for the plurality of data entries, wherein each weight in the plurality of weights is determined for a respective data entry in the plurality of data entries;

selecting a group of data entries from among the plurality of data entries by executing a resampling algorithm with respect to the plurality of data entries based on the plurality of weights assigned to the plurality of data entries;

determining a plurality of k-length sequences present in the group of data entries, wherein each k-length sequence in the plurality of k-length sequences is determined by applying a shuffling algorithm to a respective data entry in the group of data entries;

determining a plurality of frequencies corresponding to the plurality of k-length sequences, each respective frequency in the plurality of frequencies corresponding to a respective k-length sequence in the plurality of k-length sequences and being determined based on (i) a respective number of instances of the respective k-length sequence in the plurality of k-length sequences and (ii) a total number of k-length sequences present in the plurality of k-length sequences;

selecting a plurality of candidate sequences from among the plurality of k-length sequences by comparing the plurality of frequencies corresponding to the plurality of k-length sequences to a first predefined threshold;

determining a plurality of support values corresponding to the plurality of candidate sequences, each support value in the plurality of support values corresponding to a respective candidate sequence in the plurality of candidate sequences and being determined based on (i) a respective number of data entries that include the respective candidate sequence in the plurality of data entries and (ii) a total number of data entries in the plurality of data entries;

selecting a plurality of output sequences from among the plurality of candidate sequences by comparing the plurality of support values corresponding to the plurality of candidate sequences to a second predefined threshold; and transmitting an output signal indicating the plurality of output sequences to one or more electronic devices.

30. The non-transitory computer-readable medium of claim 29, further comprising program code that is executable by the one or more processing devices for causing the one or more processing devices to:

detect an event based on the plurality of output sequences; and generate a notification to a user about the event.

* * * * *